United States Patent [19]
Danielson

[11] 3,990,811
[45] Nov. 9, 1976

[54] CIRCULATION CONTROLLED ROTARY WING AIRCRAFT AND CONTROL SYSTEM THEREFOR

[75] Inventor: Henry C. Danielson, Northridge, Calif.

[73] Assignee: The United States of America as represented by the Secretary of the Navy, Washington, D.C.

[22] Filed: Feb. 26, 1975

[21] Appl. No.: 553,208

[52] U.S. Cl. .......................... 416/20 R; 416/90 A; 416/18
[51] Int. Cl.² .................................. B64C 27/18
[58] Field of Search ............ 416/18, 20, 20 A, 90 A

[56] References Cited
UNITED STATES PATENTS

| 1,982,968 | 12/1934 | Stalker | 416/90 X |
|---|---|---|---|
| 2,519,762 | 8/1950 | Hoffmann et al. | 416/18 |
| 2,547,721 | 4/1951 | Stalker | 416/18 |
| 2,581,773 | 1/1952 | Stalker | 416/114 |
| 3,005,496 | 10/1961 | Nichols | 416/18 |
| 3,039,537 | 6/1962 | Heidelberg | 416/20 |
| 3,211,397 | 10/1965 | Laing et al. | 416/20 |
| 3,524,711 | 8/1970 | Cheeseman et al. | 416/20 |
| 3,525,576 | 8/1970 | Dorand | 416/20 |
| 3,713,750 | 1/1973 | Williams | 416/20 |
| 3,883,266 | 5/1975 | Soulant | 416/20 X |

FOREIGN PATENTS OR APPLICATIONS

| 481,023 | 2/1952 | Canada | 416/18 |
|---|---|---|---|
| 634,332 | 3/1950 | United Kingdom | 416/20 |
| 682,509 | 11/1952 | United Kingdom | 416/18 |
| 856,975 | 12/1960 | United Kingdom | 416/20 |

*Primary Examiner*—Everette A. Powell, Jr.
*Attorney, Agent, or Firm*—R. S. Sciascia; L. I. Shrago; C. E. Vautrain, Jr.

[57] ABSTRACT

A control system for rotary wing aircraft having a circulation controlled rotor is provided. Two axial flow air compressors driven from the engine input shaft provide an air flow which is ducted to the rotor blades through a bifurcated duct and a non-rotating air plenum and released through spanwise slots in the blades. Damping is accomplished by a conically shaped diverter valve in the air plenum and a butterfly valve adjacent the air compressors. Aircraft stability is achieved through a gyro coupled to the rotor shaft which integrates pilot controlled input with rotor cyclic flap moment input.

2 Claims, 1 Drawing Figure

U.S. Patent     Nov. 9, 1976     3,990,811
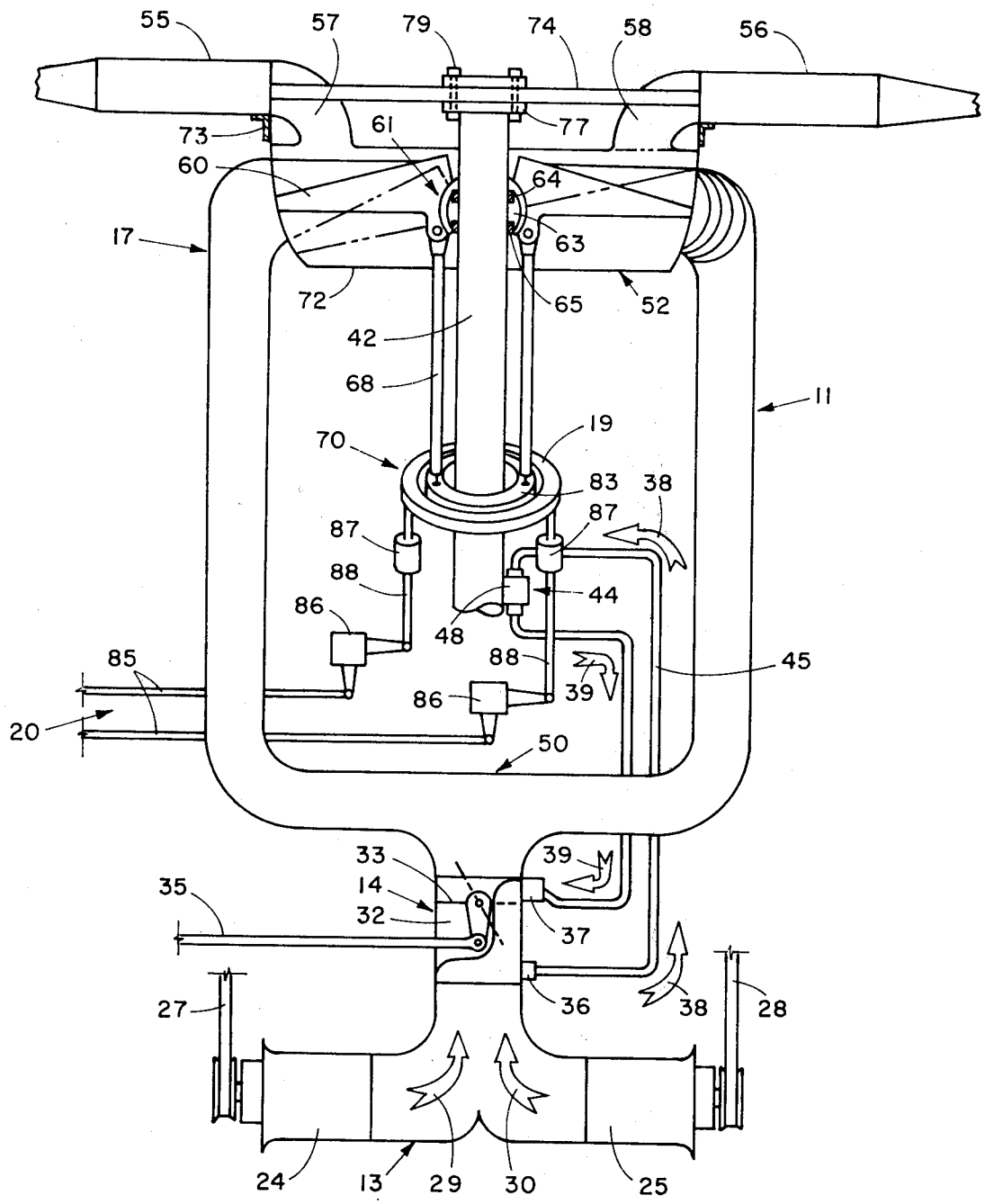

CIRCULATION CONTROLLED ROTARY WING AIRCRAFT AND CONTROL SYSTEM THEREFOR

This invention concerns rotary wing aircraft and, more particularly, means for damping rotor disturbances by the selective dispersion of compressed air in a hub cyclic control system.

A helicopter in flight is subject to disturbances from wind gusts and other sources which displace the body of the helicopter with respect to the rotor either in pitch or roll. As with other bodies in rotary motion, the rotor tends to maintain its plane of rotation so that any divergence between the rotor and the body of the helicopter is taken up in bending of the rotor blades and the rotor shaft. This change of the helicopter body with respect to the rotor produces forces which incude the body to spring back toward the rotor, usually with such force that the body passes through the neutral position and continues in the opposite direction causing rapidly increasing oscillations until a dangerous condition is approached.

This type of oscillatory disturbance is normally countered by the pilot who alters the plane of rotation of the rotor blades so that they are tilted in the direction of the pitch or roll of the helicopter body. By such tilting, a lesser reaction force is built up which tends to return the helicopter body to the attitude from which it was disturbed. Because there are many forces in and about the helicopter body during its flight and on the ground which influence it about the pitch and roll axes, a considerable pilot effort is needed to maintain stability. Also, the oscillations must be detected and compensated for when they are small because if this is not done they can build up to a dangerous condition of operation.

Prior efforts to solve this problem have involved the use of an inertia device to sense vertical acceleration and then change the cyclic pitch of the rotor blades to correct helicopter attitude as disclosed in U.S. Pat. No. 2,743,071 issued Apr. 24, 1956, and a helicopter control linkage which senses and corrects deviations in roll and pitch as they occur and causes the rotor to precess in the same direction as the helicopter body deviation to damp the deviation as disclosed in U.S. Pat. No. 3,120,276 issued Feb. 4, 1964. The present invention provides a novel form of helicopter control which avoids many of the undesirable features of current helicopter pitch and roll damping methods and devices.

Accordingly, it is an object of the present invention to provide a method of and means for damping helicopter unbalancing forces by a system in which such damping is accomplished without weight-adding devices such as mechanical linkages or balancing weights.

Another object of this invention is to provide a circulation control system for damping helicopter rotor cyclic unbalancing moments by a gyro stabilized cyclic lift control which is coupled to a pilots' collective lift control.

A further object of this invention is to provide a helicopter lift control damping system for helicopters equipped with a circulation control system in which inputs may be phased to attenuate vibration.

Other objects, advantages and novel features of the invention will become apparent from the following detailed description thereof when considered in conjunction with the accompanying drawing in which the single FIGURE thereof is a schematic illustration partly in section of a preferred embodiment of the invention.

Helicopter balance control is achieved in the circulation and control system of the present invention by providing a dual flow of compressed air to a plenum in which is positioned a diverter valve and from which air selectively diverted by the diverter valve is introduced into the rotor blades and released through exiting means therein to suppress undesired vibrations. Air released in this manner acts as a boundary layer control and keeps ambient air from separating from the air foil section of the blades, selectively increasing the lift coefficient of the blades. The diverter valve is pivotally mounted about the main rotor drive shaft and is provided with gyro control for automatic operation and mechanical control for pilot operation.

Referring to the drawing, a helicopter circulation control system 11 is shown which includes a source of compressed air 13, valving means therefor indicated at 14, and a distribution system 17 for controlling the distribution of compressed air to the rotor blades. For automatic or pilot control the distribution system is coupled to, respectively, a gyro 19 and a pilots' input cyclic control system 20.

The source of compressed air 13 includes a pair of axial flow air compressors 24 and 25 which are driven from the main engine input shaft, not shown, by a pair of belts 27 and 28, respectively. Air passes through the compressors as indicated by arrows 29 and 30 to a common valve chamber 32 in which preferably is positioned a butterfly valve 33 which is shown in the closed position in solid line and in the open position in phantom line. Valve 33 is operated by a rod 35 which is linked directly in conventional manner, not shown, to the pilots' collective control stick, also not shown. Valve chamber 32 provides for the dual functions of receiving mass air flow for control valve 33 and automatic actuated check valves 36 and 37 which permit the flow of air only in the directions indicated by arrows 38 and 39.

In distribution system 17, a main rotor shaft 42 is shown and, abutting against this shaft, a rotary valve 44 which is inserted in a conduit 45 which connects valve 36 to valve 37. Valve 44 preferably is a split disc valve which is provided with a rotating half disc, not shown, and a non-rotating half disc, not shown. This valve is connected to a cylindrical resilient member 48 which is maintained in contact with shaft 42 and is geared in a conventional manner, not shown, to rotate at twice the rotational rate of rotor shaft 42. Valve 44 and member 48 may be adjusted rotationally around rotor shaft 42 to phase its input for maximum attenuation of the undesirable two-per-revolution vibration which is common in helicopters. Distribution system 17 also includes a bifurcated duct 50 which conveys the air flow out of chamber 32 to an air plenum 52 which preferably is non-rotating and from plenum 52 to rotor blades 55, 56 and a pair of orthogonally deployed rotor blades, which are not shown in this view, through ducts as indicated at 57 and 58. Compressed air is selectively released through spanwise slots in the upper surfaces of the blades, not shown. A diverter valve 60, which preferably is conical in shape, is disposed in chamber 52 and is adapted for mounting with a ball joint 61 which includes a spherical member 63 that is secured to shaft 42 by contractable rings 64 and 65.

Valve 60 is positionable in plenum 52 between the positions shown in solid line and in phantom line through 360° by a plurality of rods 68 which are connected to a gyro and pilots' control system 70 which is shown in schematic form. The wall 72 of plenum 52 extends alongside and is secured to a circular guide ring 73 which is shown in angle form. The support of the rotor blades is provided by a rotor hub 74 which is bolted to a top flange 77 by a plurality of bolts 79. The air flow into ducts 57 and 58 is controlled by the displacement of diverter valve 60 and valve 33.

The control system for operation of diverter valve 60 preferably includes a gyro which is shown schematically at 19 and an inner ring 83 which is slaved to gyro 19 in a conventional manner, not shown. Pilot control signals are entered through gyro 19 by means of a plurality of rods 85 which are connected via a similar plurality of bell cranks 86.

In operation, for the condition of no lift such as in ground testing or warm up, valve 33 is closed. When initial or increased lift is desired, valve 33 is opened proportionally to provide the collective lift required for take off or a desired mode of flight. Gyro 19 integrates pilot input through ring 83 with rotor cyclic flap moment input through rods 68. The attitude of gyro 19 controls the attitude of diverter valve 60 which in turn modulates the flow of air to the rotor blades cyclically to provide the desired control, stability and trim for rotary wing aircraft. A pair of negative springs 87 allow gyro 19 to move without resistance and or feedback through respective pilot control linkages 88.

The rotor cyclic flap moment input causes a cyclic lift change to compensate for any external disturbances such as wind gusts by automatic control, through gyro 19, of vehicle attitude without pilot input. Valve 44 introduces phased changes in air flow to the rotor blades in response to cyclic changes sensed by member 48. The rotating and non-rotating half discs of valve 44 form the phase input to plenum 52, selectively providing corrective forces to the rotor blades in direct response to the external forces tending to create rotor unbalance.

What is claimed is:

1. A system for damping helicopter unbalancing forces occasioned by wind gusts or other vibrations or disturbances which displace the body of the helicopter, having a rotor blade hub, a main engine which includes a rotor drive shaft, and a rotor lift system which includes a plurality of hollow rotor lift blades connected to said hub, with respect to its rotor lift blades in pitch and/or roll comprising:
   means powered by the helicoper main engine for providing a dual flow of compressed air to the helicopter rotor lift system,
       said means including at least two oppositely disposed axial flow air compressors, a common chamber for receiving the flow of air from said compressors, and a butterfly valve in said chamber for controlling the passage of air therethrough;
   a plenum centrally positioned immediately beneath said hub and connected to each of said axial flow air compressors,
       said plenum stationary with respect to said rotor blades and means in said plenum for selectively controlling the flow of compressed air to the rotor blades including equalizing said flow of air;
   means communicating between the interior of said rotor blades and the adjacent portion of said plenum;
   exiting means in said rotor blades for releasing compressed air therefrom in relation to the unbalancing moments to be damped;
   means for altering the position of said flow control means in said plenum so as to reduce or block the flow of compressed air to the rotor blades in one sector of the plane in which the rotor blades may be rotating and to enhance the flow of compressed air to rotor blades in the sector opposite to said one sector;
   at least two automatic actuated check valves connected to said chamber one above and one below the closed position of said butterfly valve,
       said conduit means extending to a position adjacent said shaft driving the lift rotor of said helicopter, conduit means interconnecting said check valves,
       a rotatable split disc valve in said conduit adjacent said shaft and a cylindrical resilient member encompassing said split disc valve and contacting said shaft so that the rotation of said shaft is communicated to said split disc valve and creates a phased flow of air through said conduit,
       the flow of compressed air to said split disc valve originating in said common chamber at a position before said butterfly valve and the phased flow of compressed air exiting said split disc valve entering said common chamber beyond said butterfly valve;
   a mechanical linkage connecting said butterfly valve to the pilots' collective control stick so that a maximum supply of phased compressed air is obtained when said butterfly valve is in the closed position causing maximum damping on command to attenuate the two-per-revolution vibration common in helicopters;
   a gyro and means for automatically changing the attitude of said flow control means in response to relative changes in the attitude of said gyro upon the occurrence of said unbalancing forces,
       said gyro including an inner control ring disposed within and slaved to said gyro;
   means connected to the helicopter pilots' control station for entering manual changes in the attitude of said gyro; and
   means connecting said control ring to said compressed air flow control means in said plenum for positioning said flow control means in response to automatic or manually initiated changes in relative gyro attitude,
       whereby unbalancing forces which act upon the rotor blades in said one sector to reduce the lift coefficient thereof and cause unbalancing of the helicopter are compensated for by having the lift coefficient increased through the flow of compressed air released through the blades in the affected sector.

2. In a helicopter having a body, a main engine mounted in said body, a rotor shaft driven by said main engine, and a main rotor attached to said drive shaft and including at least partially hollow rotor blades, the improvement comprising:
   a controlled compressed air circulation system incorporated with the main engine and main rotor for damping rotor cyclic unbalancing moments by increasing the lift coefficient of selected rotor blades, said system including means powered by said main engine for providing a source of compressed air, means for collecting and distributing said compressed air to said rotor blades, means for limiting the distribution of compresssed air to rotor blades in a selected sector of their plane of rotation and exiting means in said rotor blades for releasing compressed air therefrom to improve the lift coefficient of blades in said selected sector, said means for limiting the distribution of compressed air being a gyro-slaved control means in which the slaved element encircles said rotor shaft, the gyro element encircles the slaved element, and said means for collecting and distributing compressed air includes a plenum and a diverting means therein, said diverting means operable by said slaved element to determine the sector to which compressed air is diverted;

means for altering said sector in response to changes in helicopter unbalancing forces;

means for effecting pilot control and automatic control of said compressed air circulation system;

a pilots' collective lift control and means coupling said gyro element to said pilots' collective lift control to provide for manual operation of said means for distributing compressed air; and means contacting said main rotor shaft and coupled to said compressed air system for phasing at least a portion of the compressed air to said shaft rotation to attenuate rotor vibration, said rotor blades having spanwise slots in the upper surfaces thereof for exiting compressed air.

* * * * *